US 8,478,825 B2

(12) United States Patent
Gustafsson et al.

(10) Patent No.: US 8,478,825 B2
(45) Date of Patent: Jul. 2, 2013

(54) METHOD AND ARRANGMENT IN A COMMUNICATION SYSTEM FOR DELIVERING MESSAGES TO A RECIPIENT

(75) Inventors: Åke Gustafsson, Huddinge (SE); Anders Eriksson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 864 days.

(21) Appl. No.: 11/909,518

(22) PCT Filed: Nov. 30, 2005

(86) PCT No.: PCT/SE2005/001801
§ 371 (c)(1),
(2), (4) Date: Sep. 24, 2007

(87) PCT Pub. No.: WO2006/101428
PCT Pub. Date: Sep. 28, 2006

(65) Prior Publication Data
US 2010/0169424 A1    Jul. 1, 2010

(30) Foreign Application Priority Data
Mar. 24, 2005    (SE) .................................. 0500666

(51) Int. Cl.
*G06F 15/16*    (2006.01)
(52) U.S. Cl.
USPC .......................................... 709/206; 709/246
(58) Field of Classification Search
USPC ................................. 709/206, 246
See application file for complete search history.

(56) References Cited

U.S. PATENT DOCUMENTS

| 6,052,372 | A  | * | 4/2000  | Gittins et al. ................. 370/396 |
| 6,625,258 | B1 | * | 9/2003  | Ram et al. .................. 379/88.13 |
| 7,203,294 | B2 | * | 4/2007  | Carnazza et al. ........ 379/142.07 |
| 7,269,627 | B2 | * | 9/2007  | Knauerhase .................. 709/206 |
| 7,272,662 | B2 | * | 9/2007  | Chesnais et al. ............. 709/246 |
| 7,415,502 | B2 | * | 8/2008  | Vishik et al. ................. 709/206 |
| 7,610,340 | B2 | * | 10/2009 | Kelley et al. ................. 709/206 |
| 7,668,911 | B2 | * | 2/2010  | Miyata et al. ................ 709/204 |

(Continued)

FOREIGN PATENT DOCUMENTS

| EP | 1 265 408 A1 | 12/2002 |
| JP | H10-336319 A | 12/1998 |
| JP | 2002-057693 A | 2/2002 |

*Primary Examiner* — Duyen Doan

(57) ABSTRACT

The described messaging arrangement for delivering communication messages to recipients in a communication system comprises a number of messaging servers (201-204), a common message store (205) and a dispatcher (206). The messaging servers (201-204) are able to receive a message destined to a recipient, to store the message in the common message store and to inform the dispatcher of the received message that has been stored in the common message store. The dispatcher is then arranged to decide which messaging server to invoke for delivery of the message to the recipient. This decision could be made based on delivery preferences of the recipient. Thereafter, the dispatcher invokes the messaging server that has been decided to deliver the message, and the decided messaging server retrieves and delivers the message to the recipient. If necessary, the decided messaging server adapts the message to a message type handled by the decided messaging server. By this solution, a recipient could receive the message in any preferred message type, regardless of originating message type. Also, this arrangement makes it easier for an operator to integrate new messaging technologies handling new message types in the system.

24 Claims, 11 Drawing Sheets

U.S. PATENT DOCUMENTS

| | | | |
|---|---|---|---|
| 7,716,289 B2* | 5/2010 | Malik | 709/206 |
| 7,725,542 B2* | 5/2010 | Daniell et al. | 709/206 |
| 2002/0160757 A1* | 10/2002 | Shavit et al. | 455/414 |
| 2003/0023691 A1* | 1/2003 | Knauerhase | 709/206 |
| 2008/0189388 A1* | 8/2008 | Khare et al. | 709/217 |
| 2010/0042693 A1* | 2/2010 | Eriksson et al. | 709/206 |

* cited by examiner

METHOD AND ARRANGMENT IN A COMMUNICATION SYSTEM FOR DELIVERING MESSAGES TO A RECIPIENT

FIELD OF THE INVENTION

The present invention relates to methods and arrangements in communication systems, and more particularly it relates to methods and arrangements for delivering messages to a recipient such that the communication between the recipient and a sender of the message is facilitated.

BACKGROUND OF THE INVENTION

In an all-communicating world, as we are experiencing today, media types such as voice, data, images and video are conveniently communicated anywhere and anytime in the world, thereby increasing quality of life and productivity, and enabling a more resource efficient world. Messaging is a key-service for end-users in such a world. In such a world, people shall be enabled to send and receive messages in their preferred manner, without caring about capabilities of their communication partners.

To enrich end-user experience and allow the end-user more freedom in choosing media formats, capabilities of messaging services are continuously improved. These improvements, however, should not lead to a fragmentation of the set of addressable communication partners for users of new technologies. I.e. it should not lead to a situation where a user of a new messaging service or technology can only communicate with other users that are enabled for the new messaging service or technology. Therefore, efforts are made to support features for interworking between new and well-established messaging technologies to allow a smooth migration into a world of integrated messaging.

With the advent of multimedia and 3G in the telecommunication area, an important technical break-through has come. It is no longer necessary to consider the type of media that should be the base for the communication and dependant on that media decide how to communicate. Neither is it necessary to consider place or time and base the choice of communication means on those factors.

Technically, 3G and multimedia allows communicating anywhere, anytime using any media type (video, voice, image and text) and combinations of them.

Still, the introduction initially creates a fragmentation of communication capabilities, as it is impossible to upgrade all users to the latest technology in one step. The success of SMS and mobile telephony in general shows the importance of services to work with an almost self-understanding reliability.

As mentioned above, it has been discovered that the end-user would like to decide how to communicate entirely based on his/her current communication need. E.g. an end-user that sends a message would like to be able to send the message in a format suitable for his/her current needs, and the end-user that receives the message would like to receive the message in a format suitable for his/her current needs.

Most prior art solutions for enabling messaging between end-users, or from an originator of a message to a recipient of a message, are based on vertical architectures, wherein each messaging solution stands alone, i.e. has its own functionality for provisioning, service management etc. FIG. 1 shows a communication system having a vertical messaging architecture, which is commonly deployed by operators today. Here, each messaging service or message type, e.g. Messaging over IP (MoIP), Multimedia Messaging Service (MMS), Instant Messaging (IM), Short Message Services (SMS), brings with it its own client, e.g. SMS client, MMS client and Instant Messaging and Presence Services (IMPS) client, installed at the end user domain, and its own Service Centre, e.g. MoIP centre, Multimedia messaging Centre (MMC), SMS-C and IMPS service centre. In this solution each service centre has its own message store, its own user directory, own notification server and sometimes own O&M system. The MoIP service centre is the Ericsson system for handling Voice mail, Web mail and Email services. This vertical messaging architecture also has some functions in the Service Network Domain in common for the different messaging services, such as a Common directory and common functions for Provisioning, Charging, O&M and Authentication. It also has Border gateways for communication to other networks, e.g. Voice gateway, Push proxy gateway and WAP gateway. The communication system is also provided with connections to a business management domain, a network management domain and an application domain. The connection to the application domain is enabled via a Value Added Service Provider gateway (VASP GW). A Multimedia Library (MML) is also provided which stores e.g. MMS messages to users. The MML also enables for a user to access other multimedia content from the MML. Thereby, the MML functions as storage, content retrieval enabler and enables sharing of messages.

From experience in deploying vertical solutions, it is clear that the lack of common functionality increases integration and maintenance costs 10-fold for every additional node or messaging solution in the system. Also, experience shows that vertical solutions have extremely long time to market for deployment of communication services, such as mobile services. Therefore, there is a demand from e.g. operators and other providers of communication services to shift from a vertical messaging architecture towards a horizontal messaging architecture, where certain functionality are in common for the different messaging services.

As stated above there is a need for a user to be able to communicate with anyone based on the user's own current communication need and communication capabilities. Also, there is a need for operators to be able to provide horizontal messaging solutions/architectures such that the messaging architecture could easily be added with a new messaging technology handling a new message type.

In the application, a message type is defined as the messages handled by a certain messaging server. E.g. normally an Email server handles the message type Emails, a Voice mail server handles the message type Voice mails and an MMS server handles the message type MMS messages. Also, it may be possible that one messaging server handles more than one kind of messages. Then, the term message type may actually include more than one kind of messages, e.g. MMS and SMS.

SUMMARY OF THE INVENTION

An object of the present invention is to provide a method and an arrangement for delivering messages in a communication system to recipients such that a message is received at a recipient as a certain message type, regardless of type of original message.

Another object of the present invention is to provide a method and an arrangement for delivering messages in a communication system to recipients such that new messaging types could be handled by the method and arrangement with only small changes to the arrangement.

The above objects are achieved by a method and an arrangement set forth in the characterizing part of the independent claims.

According to a first aspect, the invention relates to a method in a communication system for delivering communication messages to recipients. The communication system comprises:
- a number of messaging servers for handling different types of messages, each messaging server handling messages of a certain message type;
- a common message store for storing messages received from any of the number of messaging servers, and
- a dispatcher for handling the delivery of messages to the recipients.

The method comprises the steps of:
- Receiving, in a receiving messaging server, a message destined to a recipient of the message;
- Storing the message in the common message store;
- Informing, by the receiving messaging server, the dispatcher of the received message;
- Deciding, by the dispatcher, which messaging server to invoke for delivery of the message;
- Invoking, by the dispatcher, the decided messaging server to deliver the message;
- Receiving, at the decided messaging server, the message from the message store;
- Adapting the message to a message type handled by the decided messaging server, if the if the message is of a type different from the message type handled by the decided messaging server; and
- Delivering the message to the recipient.

According to a second aspect, the invention relates to an arrangement in a communication system adapted for delivering communication messages to recipients.

The arrangement comprises:
- a number of messaging servers adapted for handling different types of messages, each messaging server being adapted for handling messages of a certain message type;
- a common message store adapted for storing messages received from any of the messaging servers, and
- a dispatcher adapted for handling the delivery of messages to the recipients.

Each of the number of messaging servers is further adapted for:
- receiving a message destined to a recipient of the message;
- informing the dispatcher of the received message;
- adapting the message to a message type handled by the messaging server, if the message is of a type different from the message type handled by the messaging server; and delivering the message to the recipient.

The dispatcher is further arranged for:
- Deciding which messaging server to invoke for delivery of the message and
- Invoking the decided messaging server to deliver the message.

According to a third aspect, the invention relates to a node in a communication system arranged for handling delivery of communication messages to recipients, the communication system having a number of messaging servers for handling different types of communication messages, each messaging server being arranged to handle messages of a certain message type, the node comprising:
- a communication interface arranged for communication with other entities in the communication systems, and
- a route resolving unit and a scheduling unit for controlling the delivery of messages to the recipient. The node is further arranged for:
  receiving, at the communication interface, information from a messaging server of a message received at the messaging server,
  deciding a messaging server responsible for delivery of the message, based on delivery preferences of the recipient; and
  invoking the decided messaging server to deliver the message.

According to a fourth aspect, the invention relates to a method in a node in a communication system for handling delivery of communication messages to recipients, the communication system having a number of messaging servers for handling different types of communication messages, each messaging server being arranged to handle messages of a certain message type. The method comprises the steps of:
  receiving information from a messaging server of a message received at the messaging server,
  deciding a messaging server responsible for delivery of the message, based on delivery preferences of the recipient; and
  invoking the decided messaging server to deliver the message.

An advantage of the present invention is that it provides the end-user with a common mailbox for all his/her messages.

A further advantage of the present invention is that it provides an operator of the communication system with a horizontally integrated messaging solution based on re-use and sharing of common functions and components. Thereby, it will be easier for the operator to integrate new messaging technologies handling new message types in the system.

A still further advantage is that it makes it possible for an end-user to receive messages in a format or type defined by the end-user, regardless of the message format or type of the message when it was transmitted from the message originator.

Another advantage of the invention relies on the fact that the actual message does not follow the request regarding how to handle the message. Thereby, the message is not unnecessary sent within the messaging system, thereby avoiding to put unnecessary load on the system.

Yet another advantage is that the invention allows for optimized direct delivery of messages to avoid latency introduced by the disk storage when near real-time characteristics are needed, e.g. in chat sessions. In addition, the direct delivery provided by the invention does always have a fallback to the store and forward function described in this invention.

BRIEF DESCRIPTION OF THE DRAWINGS

The invention will in the following be described in more detail with reference to enclosed drawings, wherein.

DETAILED DESCRIPTION

Figure 1:
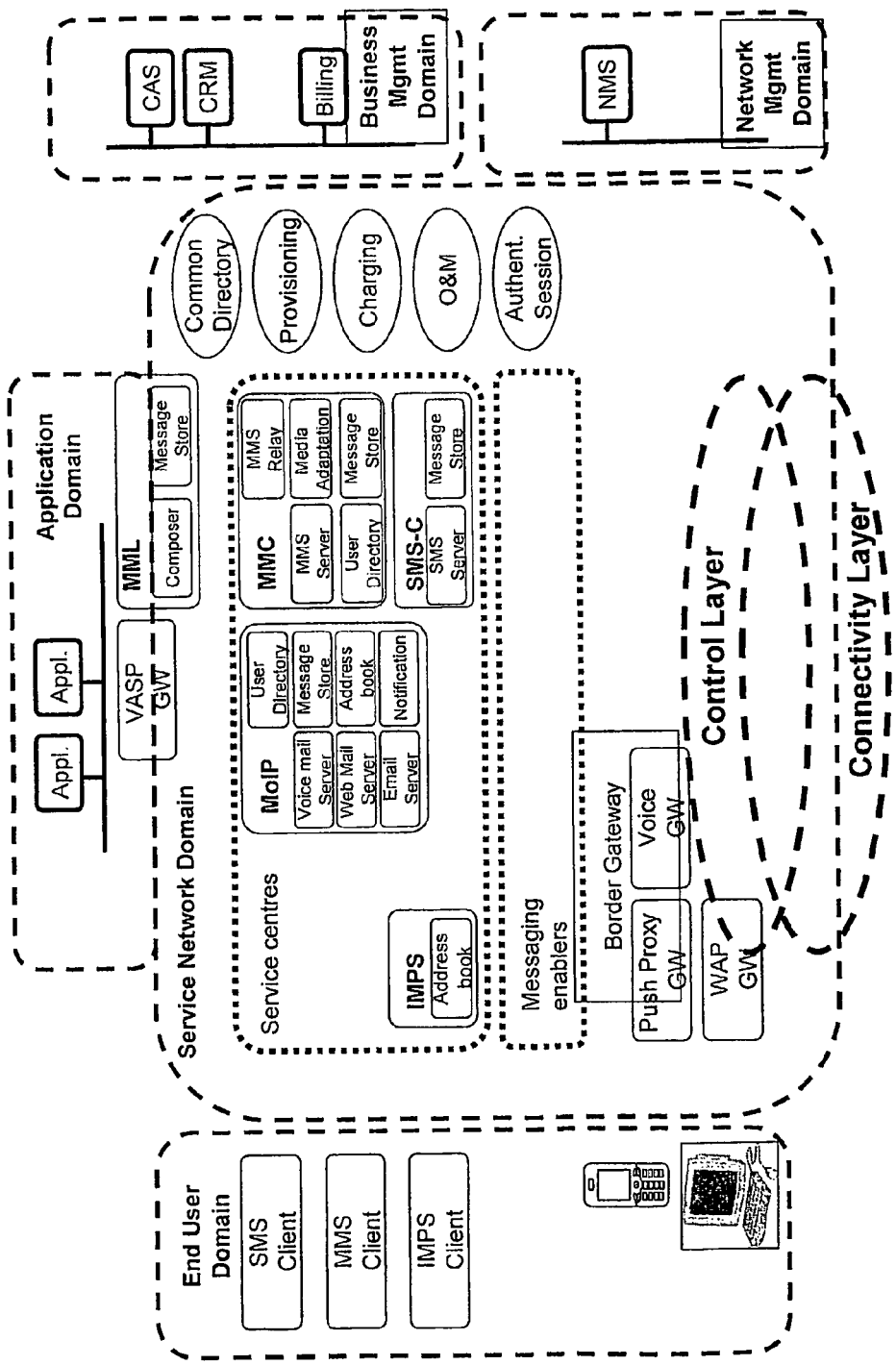
FIG. 1 describes a schematic block diagram of a messaging architecture according to prior art.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The messaging arrangement and method according to the invention reflects the desire to establish a sustainable messaging business that corresponds to end-user needs. There is a particular challenge to migrate to a more advanced way of fulfilling these needs without creating technology islands where only few users can communicate with each other or the burden of the technology shift is put on the end-user. The messaging arrangement and method according to the invention aims to secure a consistent messaging service to advanced end-users while addressing the limitations set by legacy technologies used by other end-users and allowing interworking between messaging services.

Figure 2:
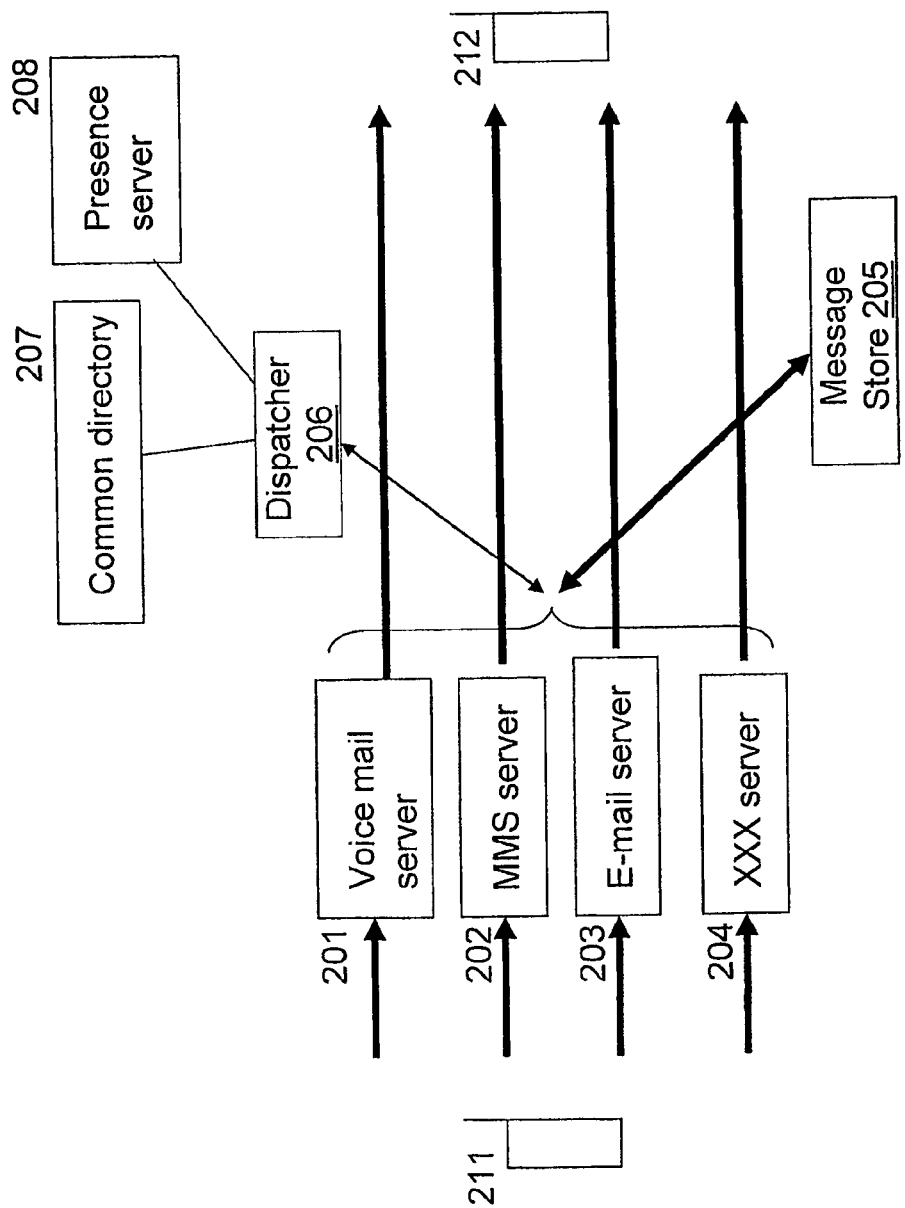
FIG. 2 is a schematic block diagram of a messaging arrangement according to the invention.

Taking into consideration all of the aforementioned criteria's, an arrangement according to an embodiment of the invention may be arranged as shown in FIG. 2. The arrangement of FIG. 2 comprises a number of messaging servers, each handling one message type: A voice mail server 201 handling voice mails, an MMS server 202 handling MMS messages, an Email server 203 handling Emails, and an XXX server 204. The XXX server symbolizes any other messaging server for handling any other message type. The messaging servers 201-204 contain business logic for each messaging service, where one important aspect is protocol handling. The messaging servers are arranged for receiving a message from outside the arrangement, e.g. from a mobile terminal 211 for informing a dispatcher 206 of the received message, for sending the message to a message store 205 and for delivering the message to recipients, such as the mobile terminal 212. The arrangement also comprises two messaging enablers, briefly mentioned above: the message store 205 and the dispatcher 206, which are connected to the messaging servers 201-204. The message store 205 is a file server hosting one mailbox directory per recipient containing all the recipient's messages regardless of message type, e.g. Email, MMS, voice mail, video mail, store and forward of Instant Messages etc. The recipient is in the most regular case an end-user. Although, for transit cases, e.g. for messages sent from a first communication system of a first operator to a second communication system of another operator, as further described in connection with FIG. 8, a recipient, from the view of a messaging arrangement situated at the first communication system may be the second communication system, which has its own mailbox in the message store in the first communication system. E.g. each MM4 destination in MMS has its own mailbox for incoming/outgoing traffic. MM4 is an interface in the MMS reference architecture. It is the reference point between one MMS Server and another MMS Server that is within another Multimedia Message service environment. MM4 and other MMS interface are described in Chapter 6 of the 3GPP Technical Specification TS 23.140 Version 5.11.0, published 2004-06. The message store is a common message store in that it stores messages of all different types. Each mailbox has at least an inbox and an outbox folder but may also have other folders for sent items etc.

The Dispatcher 206 is the heart of the messaging apparatus and ensures that messages are delivered. The dispatcher 206 comprises two distinct parts: A route resolver that decides which messaging server type to use for message delivery; and a timer function that decides when to deliver the message, i.e. a scheduler. The dispatcher 206 is arranged to decide which Messaging server to invoke for delivery of the message and when to do that based on preferences of the recipient, e.g. user profile, presence, etc. For the purpose of checking the preferences of the recipient, the arrangement may be associated with a common directory 207 and a presence server 208. The common directory 207 and/or the presence server 208 may then be contacted by the dispatcher 206 for the dispatcher to check up the preferences of the recipient. Consequently, the dispatcher is also arranged to invoke the decided messaging server to deliver the message to the recipient.

For the arrangement of FIG. 2, in the following a procedure according to an exemplary embodiment of the invention is described. The procedure is also illustrated by arrows, wherein the arrows written in extra bold type show the different routes a message may take from an originator, e.g. first mobile terminal 211, to a recipient, e.g. second mobile terminal 212. The normal arrows show signalling only. Signalling may also be routed over the extra bold arrows. First, a Messaging server 201-204 receives a message. The messaging server may then send an optional route lookup message to the dispatcher to check whether direct delivery of the message to the receiver in the same message type would be appropriate. Thereafter, if a response from the dispatcher to the optional route lookup, message contains an invocation to the messaging server to deliver the message directly, the messaging server delivers the message to the recipient. If not, or in the case a route lookup message is not sent, the messaging server sends the message to the message store 205, which stores the message in the recipient's inbox in the message store 205. The messaging server also informs the dispatcher 206 of the newly arrived message. The most important information sent to the Dispatcher is routing information (recipient/destination identity) and a reference to the message. Additional information includes message type and content types. When the dispatcher 206 receives this information, it decides which Messaging server to invoke for delivery of the message and when to do that based on e.g. preferences of the recipient, e.g. user profile, presence, etc. The decision may, except for being based on recipient preferences, also be based on other attributes related to the possibility of delivering the message, such as load on the messaging servers. The Dispatcher also handles if a message is to be delivered later or if retries has to be scheduled for a message, i.e. if the message should be resent if it was not successfully delivered to the recipient at the first time of delivery. At the scheduled time, the dispatcher invokes the decided messaging server, i.e. the messaging server selected by the dispatcher. The messaging server is then responsible for delivering the message to the end-user according to application rules. By separating the actual message from the request how to handle the message, a message will not be unnecessary sent within the messaging system, putting unnecessary load on the system.

If the recipient should be notified before the message is delivered, this notification procedure is the responsibility of the decided messaging server. This is because the notification procedure is often unique to each messaging service. For example, Voice mail notification and MMS notification is very different. The dispatcher's task is just to invoke the correct messaging server based on e.g. user preferences.

In case of multiple recipients of a message, the dispatcher has the responsibility to invoke one messaging server instance per recipient based on each recipient's preferences. This could result in e.g. having the message delivered as an MMS to some recipients and as an SMS to other recipients.

Figure 3:
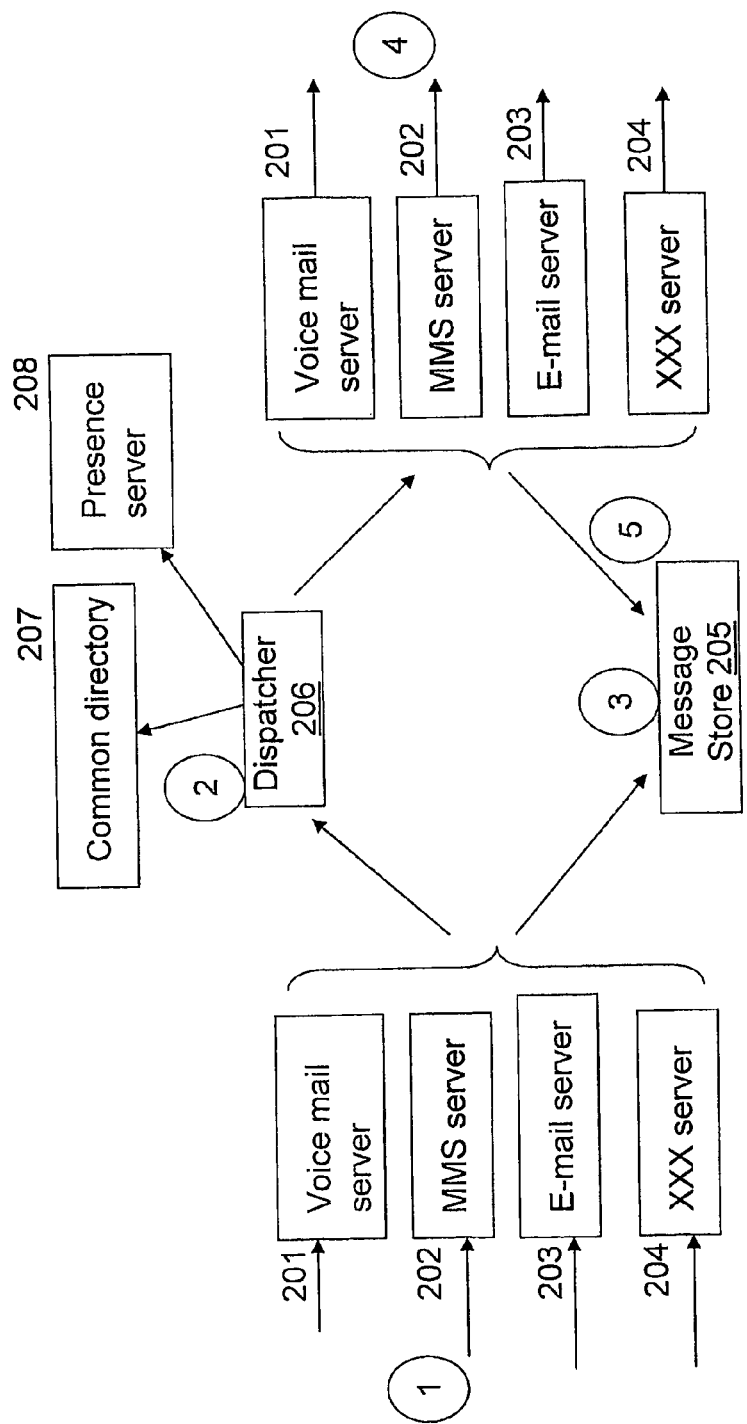
FIG. 3 is another schematic block diagram of a messaging arrangement according to the invention, including a description of how a message is handled in such a system.

FIG. 3 shows an example of a message flow through the messaging arrangement according to FIG. 2. Observe that in FIG. 3, the same messaging servers 201-204 are actually shown twice. This is done to better show how a message is handled by the messaging arrangement from when entering the arrangement in the left part of the figure until leaving the arrangement to be delivered to a recipient in the right part of the figure.

1. A message is received by any of the Messaging servers 201-204 (protocol handlers), which may screen the message (for spam and virus content) and send it to the Message store such that it is stored in the recipient's inbox in the message store 205. The Dispatcher 206 is informed of the new message arrival in the Message store. Optionally, before the message is stored in the common message store, the messaging server may send a route lookup message to the dispatcher to check whether direct delivery of the message to the recipient would be appropriate. If so, the messaging server will deliver the message directly to the recipient, using the same messaging type, and the message will not be stored in the message store.
2. The Dispatcher 206 checks how the message is to be delivered based on recipient related attributes such as user profile, etc., and selects accordingly which messaging server that should deliver the message. An event is scheduled that will invoke the selected messaging server when triggered (could be immediate).
3. The Message Store 205 functions as a message queue on a per recipient basis with random access for de-queuing controlled by the Dispatcher. Any outgoing destination is viewed as a recipient. All destinations have its own mailbox, e.g. MMS MM4 destination to operator B has its own mailbox. See FIG. 8 for more information.
4. The selected outgoing Messaging server is invoked and message delivery is initiated, including message notification (e.g. Message Waiting indication (MWI) if needed. The message is fetched from the recipient's inbox when forwarded or retrieved and if necessary adapted to the recipient capabilities.

Any outstanding Dispatcher events related to the message are deleted when the message has been safely delivered. Deleting of outstanding dispatcher events are triggered by the selected outgoing messaging server sending a message to the dispatcher informing of safe delivery of the message. This general 'delete' of scheduled events is done to avoid multiple deliveries of a message. For example, a Voice mail is to be delivered as an MMS, but could not be delivered to the recipient's terminal because it is off-line. The recipient however, uses another telephone to call his/her voice mail service to check for voice mails. He/She listens to the message and deletes it. Now, this delete requested in the Voice Mail server will as described above also delete the Dispatcher scheduled MMS retry and thus avoid multiple deliveries of the message.

5. In case the message is received by a first messaging server and is to be delivered by a second messaging server, the message has to be translated from a first type to a second type, e.g. if it is received in the Email server 203 as an Email and is to be delivered by the MMS server 202 as an MMS. The translation is normally accomplished in the selected outgoing messaging server. For the translation, message state and header mapping must be understood between the interworking messaging servers (protocol handlers). In the example above, E-mail headers have to be translated to MMS Multipurpose Internet Mail Extensions (MIME) headers and Message states has to be translated (e-mail read/un-read and MMS push codes). How a message is translated from a first type to a second type depends on the message types. In the $3^{rd}$ Generation Partnership Project (3GPP) Technical specification TS 23140, for example version 6.1.0 published 2003-03, Annex A, it is described how an MMS message is translated to and from a facsimile message, a voice mail message, an SMS, an E-mail etc. For translation between other messaging types it may be obvious or not yet specified how a translation will be accomplished.

In the above described message flow, messages are put into the queue in the message store sequentially by the incoming messaging server. They are de-queued randomly by the Dispatcher, which works as a cursor appointing the outgoing messaging server to fetch messages from the queue. The queue is per user/interface in terms of an inbox in the message store.

Figure 4:
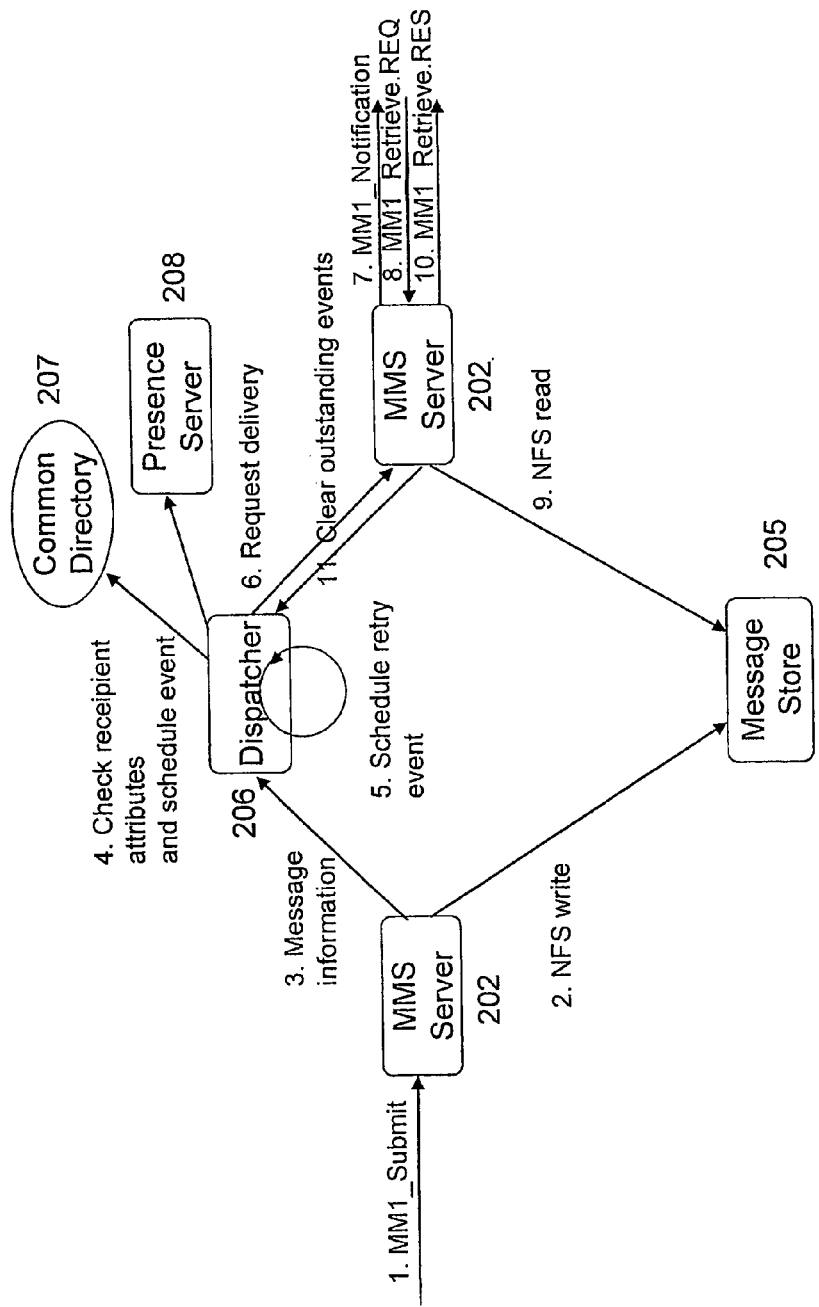
FIG. 4 shows a schematic block diagram of the messaging arrangement of the invention, including a description of how an MMS message is transported through the messaging arrangement of the invention.

FIG. 4 shows an example of a message flow according to the invention. In this example, it is shown how an MMS message passes through the messaging arrangement of FIG. 2. As in FIG. 3, the same MMS server 202 is actually shown twice, to better show how a message is handled by the messaging arrangement from when entering the arrangement in the left part of the figure until leaving the arrangement to be delivered to a recipient in the right part of the figure. Only the messaging server involved in delivering the MMS message is shown in the figure. The message flow is as follows, with reference to the numbers in FIG. 4:

1. An MM1_Submit message is received by the incoming MMS server 202, which . . .
2. . . . sends an NFS write instruction including the MMS message to instruct the message store 205 to store the message in the recipient's inbox . . .
3. . . . and informs the Dispatcher 206 of the newly arrived MMS message in a message including data such as user ID of the recipient and a message reference.
4. The Dispatcher 206 checks user (recipient) related attributes for delivery, such as user delivery preferences, and schedules (or stores) an event. In this case it results in an MMS delivery, i.e. a delivery of the message as an MMS.
5. A retry event is scheduled in the dispatcher 206 in case the message is not retrieved as a result of the notification and delivery performed below.
6. The outgoing MMS server is invoked to deliver the message. A Request delivery message, including user (recipient) ID and a message reference, is sent from the dispatcher to the MMS server.

7. An MM1_Notification message is sent to the recipient notifying the recipient of the message.
8. As a response to 7 above, the recipient will request a retrieval of the message.
9. The Message is retrieved by the MMS server from the recipient's inbox in an NFS read (Fetch message). Terminal capabilities are checked which may result in a transcoding of the message before delivery, due to a difference in terminal capabilities between sending and receiving terminal influencing the message type, such as different display resolution, voice codec etc.
10. The message is delivered to the recipient.
11. Any outstanding Dispatcher events related to the message are cleared by the MMS server sending instructions to clear the message, including recipient ID and the message reference, to the dispatcher.

Optionally, before the MMS server sends an instruction to the message store to store the MMS message, the MMS server may send a route lookup message to the dispatcher to check whether direct delivery of the MMS message to the recipient would be appropriate. If so, the MMS server will deliver the message directly to the recipient, using the same messaging type, and the message will not be stored in the message store.

Figure 5:
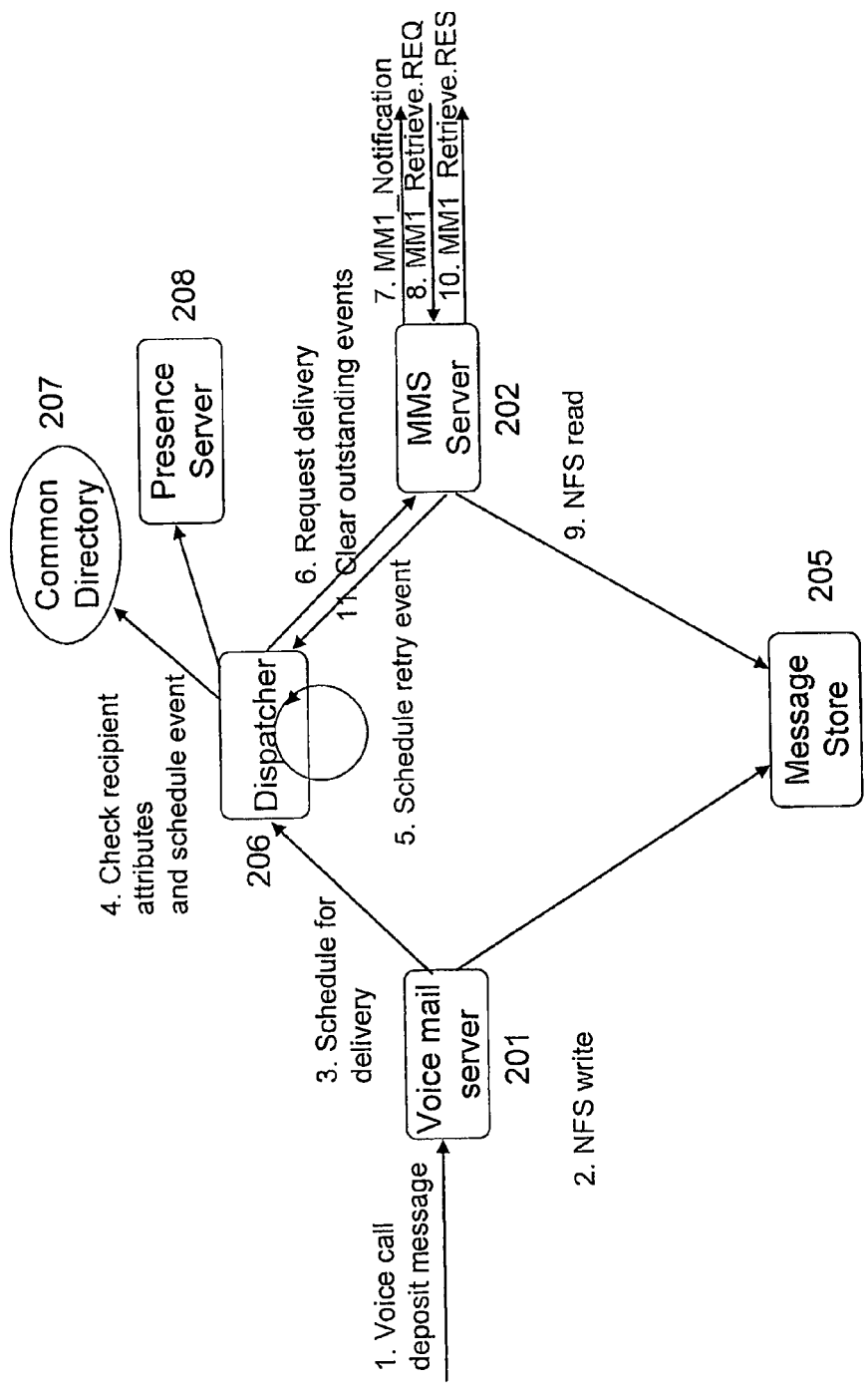
FIG. 5 shows a schematic block diagram of the messaging arrangement of the invention, with a description of how a sent voice mail message is transported through the messaging arrangement and being delivered as an MMS message.

FIG. 5 shows another example of a message flow according to the invention. In this example, it is shown how the arrangement of FIG. 2 is used to achieve interworking between messaging servers. In the example of FIG. 5 an incoming voice mail message is delivered to a recipient as an MMS message. The message flow is as follows, with reference to the numbers in FIG. 5:

1. A voice message is recorded by the incoming Voice mail server 201, which . . .
2 . . . sends an Network File System (NFS) write instruction including the message to instruct the message store 205 to store the message in the recipient's inbox . . . .
3 . . . and informs the Dispatcher 206 of the newly arrived message in a Schedule for delivery message including user ID of the recipient and a message reference.
4. The Dispatcher 206 checks user (recipient) related attributes for delivery, such as user delivery preferences, and schedules (or stores) an event. In this case it results in an MMS delivery of the original voice mail.
5. A retry event is scheduled in the dispatcher 206 in case the message is not retrieved as a result of the notification and delivery performed below.
6. The outgoing MMS server is invoked to deliver the message. A Request delivery message, including user (recipient) ID and a message reference, is sent from the dispatcher to the MMS server.
7. An MM1_Notification message is sent to the recipient notifying the recipient of the message. MM1 is an interface in the MMS reference architecture. It is the reference point between the MMS User Agent and the MMS Server. MM1 and other MMS interface are described in Chapter 6 of the 3GPP Technical Specification TS 23.140 Version 5.11.0, published 2004-06.
8. As a response to 7 above, the recipient will request a retrieval of the message.
9. The Message is retrieved by the MMS server from the recipient's inbox in an NFS read (Fetch message). The voice mail message is translated in the MMS server to an MMS message by mapping or creating MMS header attributes as needed. According to the standard 3GPP TS 23140, described above, Annex A.5, a voice mail message may be translated to an MMS message by using a Voice Profile for Internet Mail Version 2 protocol (VPIMv2), which provides format extensions for MIME supporting the transmission of voice messages over standard Internet E-Mail systems. After VPIMv2 had been reviewed by the IETF it became RFC 2421.

The VPIM specification allows voice records to be MIME encapsulated and sent as Internet mail attachments via Simple Mail Transfer Protocol (SMTP) or retrieved as Internet mail attachments via Post Office Protocol—Version 3 (POP3) or Internet Message Access Protocol—Version 4 (IMAP4). The MIME type used for voice messages is "audio/*".

For the interaction of MMS with voice mailboxes, the voice mailbox may forward received voice records as VPIM messages via SMTP to the MMS Relay/Server. After translation to MMS, the recipient's terminal capabilities are checked which may result in a transcoding of the message before delivery.

10. The message is delivered to the recipient.
11. Any outstanding Dispatcher events related to the message are cleared by the MMS server sending instructions to clear the message, including recipient ID and the message reference, to the dispatcher.

Figure 6:
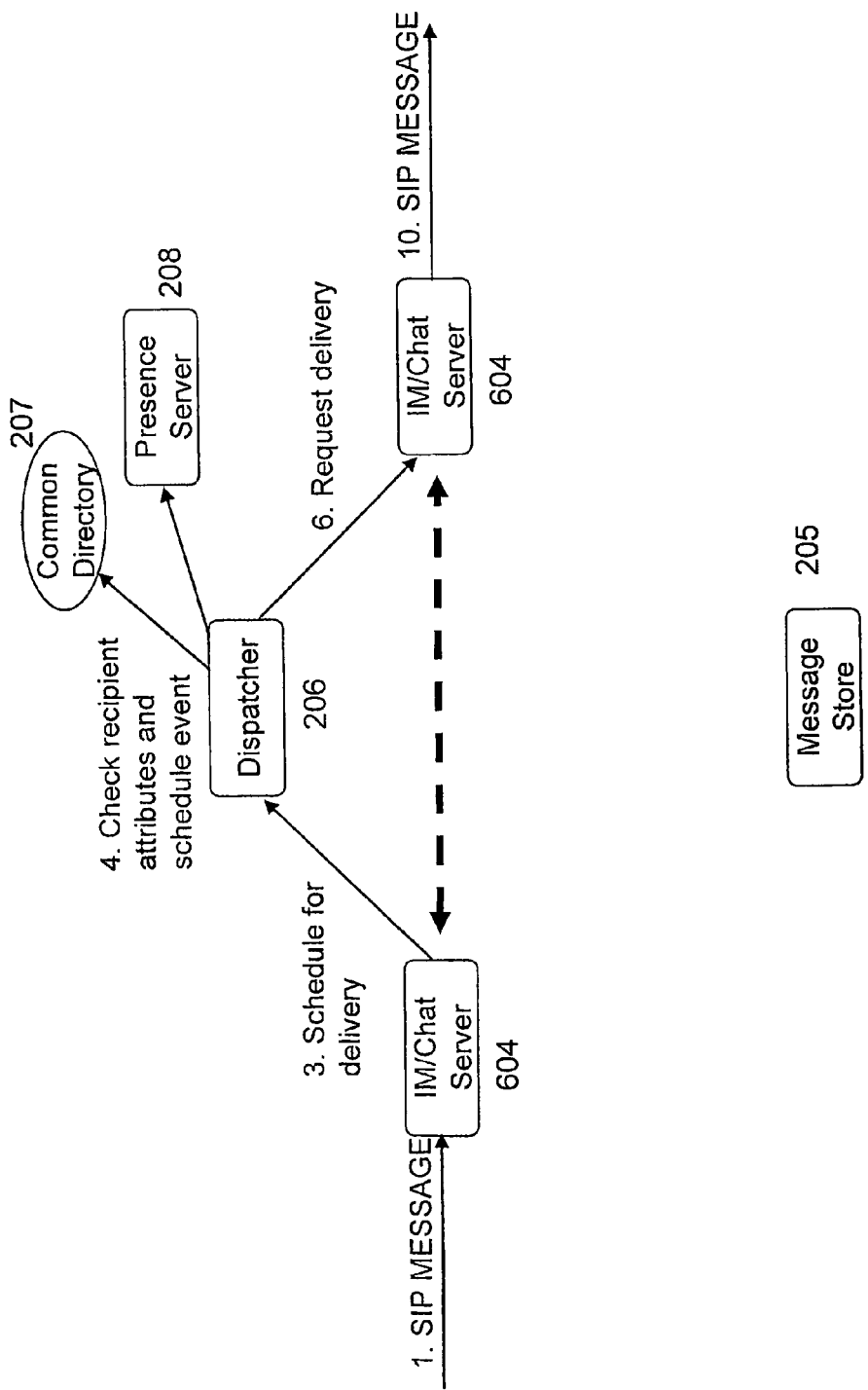
FIG. 6 describes a schematic block diagram of the messaging arrangement of the invention and describing the delivery of an Instant Message through the messaging arrangement of the invention.

The messaging arrangement shown in FIG. 2 can also be used for instant messaging. In FIG. 6 it is shown how a Session Initiation Protocol (SIP) message passes through the messaging arrangement of FIG. 2. As in FIG. 3, the same IM/chat server 604 is actually shown twice, to better show how a SIP message is handled by the messaging arrangement from when entering the arrangement in the left part of the figure until leaving the arrangement to be delivered to a recipient in the right part of the figure. The message flow is as follows, with reference to the numbers in FIG. 6:

1. A SIP message is received by the incoming IM/chat server 604, which . . .
3 . . . informs the Dispatcher 206 of the newly arrived message in a Schedule for delivery message or a route lookup message or similar, including user ID of the recipient and a message reference. This could be done as soon as the message header is received. I.e. it is not necessary to wait for the content of the message. Since this is near real-time communication time delays must be kept short.
4. The Dispatcher 206 checks user (recipient) related attributes for delivery, such as user delivery preferences, and schedules (or stores) an event. In this case it results in an IM/chat direct delivery.
6. The outgoing IM/chat server 604 is invoked to deliver the message, thereby allowing the message to be forwarded directly without storing and subsequently fetching it from the message store. I.e. incoming data can be streamed directly to the outgoing side.
10. The SIP message is delivered to the recipient.

As shown above, a SIP message associated with an IM/chat service will normally not be stored in the messages store, because of its near real-time communication characteristics. Instead it will stay in a memory, e.g. a Random Access Memory (RAM), in the IM/chat server during the short time when the dispatcher checks user related attributes. If the SIP message cannot be delivered to the recipient, the IM/Chat server 604 may start collecting all SIP messages in its RAM and deliver them sequentially when the recipient is back on-line and the connection is re-established. Although, if the queued SIP messages could not be delivered within a predefined time, they could be stored in the Message store 205 in the user's mailbox for later retrieval/delivery either when logging on to the IM application or using a different outgoing Messaging server, e.g. the MMS server 202. In this case, the SIP messages will follow the procedure described above, e.g. in connection with FIG. 3.

Figure 7:
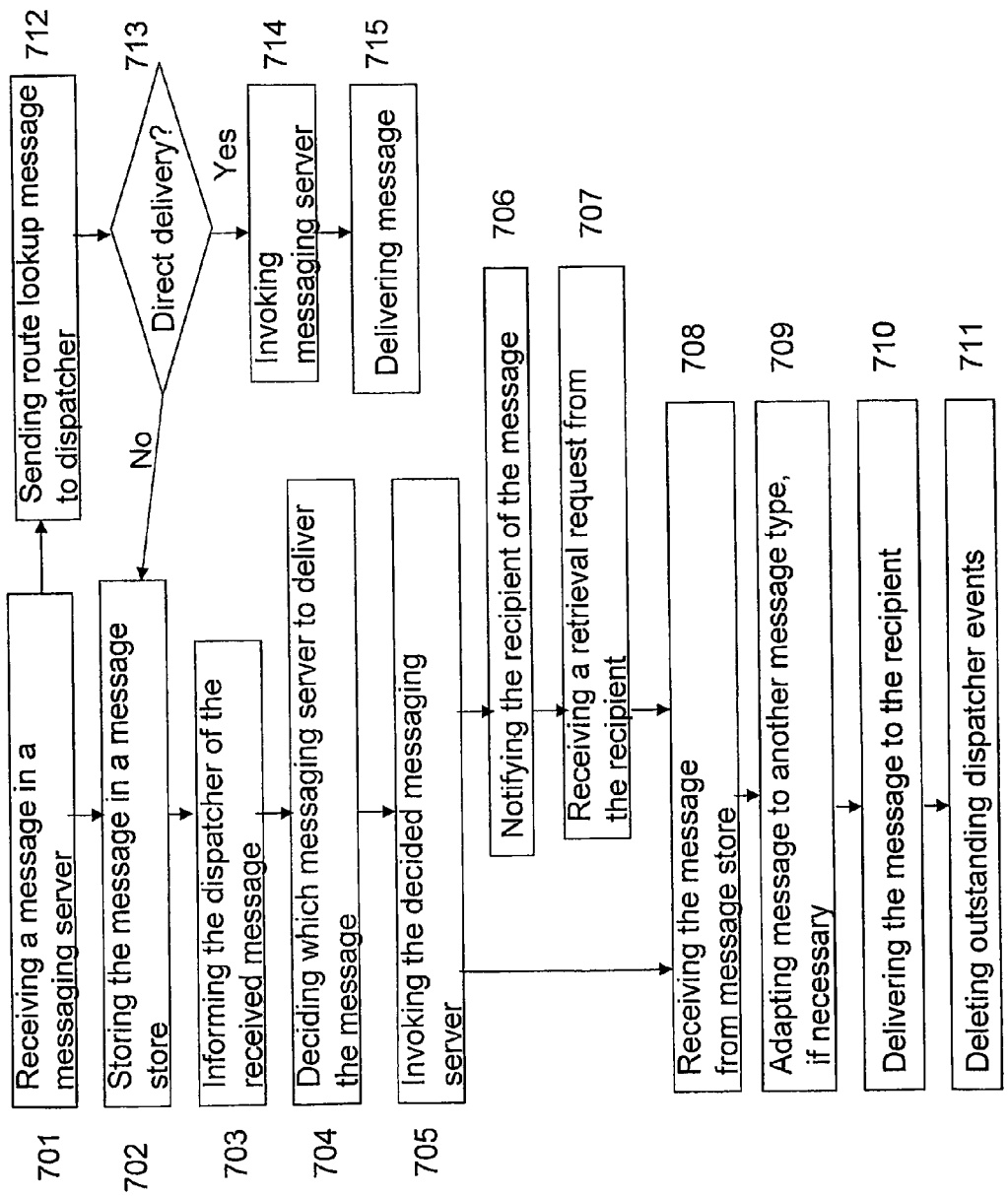
FIG. 7 describes a flow chart according to a method of the invention.

FIG. 7 shows a flow chart of a method for delivering a message to a recipient according to an embodiment of the invention. The method may use e.g. the arrangement of the invention shown in FIG. 2. The method starts by a messaging server receiving 701 a message; which type of messaging server that will handle the message depends on the message type. Optionally, the receiving messaging server may then send 712 a route lookup message to the dispatcher, the dispatcher decides 713 whether direct delivery of the message to the recipient would be appropriate. If so, the dispatcher would invoke 714 the same messaging server, in a response to the route lookup message, to deliver 715 the message directly to the recipient, using the same messaging type, and the message will not be stored in the message store. If the dispatcher decides that the message should not be delivered directly, or if the optional step of sending a route lookup message is not used, the messaging server sends the message to the message store, which stores 702 the message in an inbox related to the recipient of the message. The recipient has one inbox for all or almost all its messages, regardless of message type. The messaging server also informs 703 the dispatcher of the received message and to which recipient it is destined. Thereafter, the dispatcher decides 704 which messaging server that should deliver the message to the recipient. The decision is based on recipient attributes or preferences, such as user preferences and capabilities of the recipient, e.g. terminal capabilities. The dispatcher invokes 705 the decided messaging server to deliver the message. If requested, by the recipient or by the messaging service, the messaging server notifies 706 the recipient of the message before it is delivered. In that case, the messaging server receives 707 a retrieval request from the recipient before the message is delivered. After receiving a retrieval request or directly after being invoked, the messaging server fetches, or in any other way receives 708 the message from the message store. If the messaging server receiving the message from the message store is another messaging server than the messaging server that originally received the message, the message is adapted 709 or translated to the messaging type handled by the another messaging server. This is done e.g. by mapping or creating message header attributes related to the message type handled by the another messaging server. Thereafter, the messaging server delivers 710 the message to the recipient. After delivery, the messaging server informs the dispatcher of the delivered message, and the dispatcher deletes 711 any outstanding dispatcher events related to the message. Such outstanding dispatcher events could be e.g. a re-schedule for invoking the decided messaging server. Outstanding dispatcher events may also occur if e.g. the recipient fetches the message by calling his voice mail, if the message was decided to be delivered by an MMS server.

Figure 8:
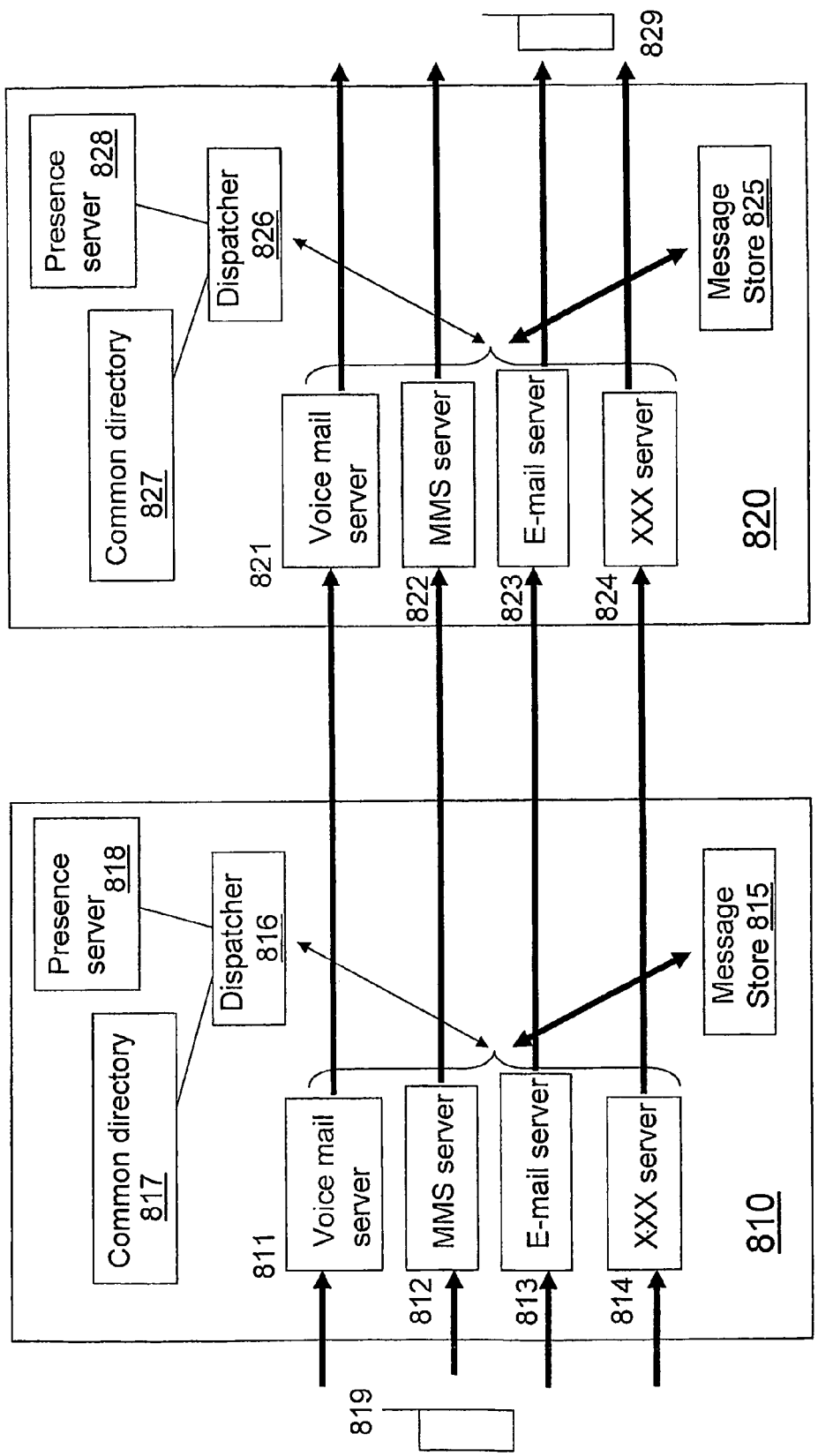
FIG. 8 describes a schematic block diagram of two communication systems, each having a messaging arrangement according to the invention.

FIG. 8 describes a first and a second communication system, each having messaging arrangements according to the invention. The first communication system 810 which may be run by Operator A, has a first messaging arrangement, comprising a first Voice mail server 811, a first MMS server 812, a first Email server 813 and a first XXX server 814. It also comprises a first Message store 815 and a first dispatcher 816, wherein the first dispatcher is associated with a first Common directory 817 and a first Presence server 818. In a similar way, the second communication system 820, which may be run by Operator B, has a second messaging arrangement, comprising a second Voice mail server 821, a second MMS server 822, a second Email server 823 and a second XXX server 824. It also comprises a second Message store 825 and a second dispatcher 826, wherein the second dispatcher is associated with a second Common directory 827 and a second Presence server 828.

When a message is sent from a terminal 819 in the first communication system, and the message is directed to a user in the second communication system, the recipient of the message as seen from the first messaging arrangement would be the second communication system. This means that the second communication system would have its own mailbox in the first message store. I.e. each MM4 destination in MMS has its own mailbox for incoming/outgoing traffic. This could be illustrated by following a message flow from the sender to the receiver in FIG. 8. The arrows written in extra bold type show the different routes a message may take within and between the systems. The normal arrows show signalling only. Signalling may also be muted over the extra bold arrows. As an example, a message originating from the terminal 819 in the first system and directed to a terminal 829 in the second system, is sent as an MMS message from the terminal 819 in the first system, and received in the first MMS server 812. The message is stored in the first message store 815 and the first dispatcher 816 is informed of the received message. The first dispatcher decides which server to use for delivering the message based on attributes of the recipient. Since the receiver is situated in the second communication system, the recipient as seen from the first messaging arrangement would be the MMS server in the second communication system, i.e. the second MMS server 822. Therefore, the first dispatcher decides to invoke the first MMS server to send the message to the second MMS server 822. When received in the second MMS server 822, the message is stored in the second message store 825 and the second dispatcher 826 is informed of the newly received message. Thereafter, the second dispatcher checks attributes (or user preferences) of the recipient, i.e. the user of the second terminal 829. The attributes may say e.g. that the recipient would like to receive his messages as Emails. Therefore, based on the attributes, the second dispatcher decides to invoke the second Email server 823 to deliver the message to a computer 829 of the recipient. When invoked, the second Email server receives the message from the second message store, adapts or translates the message to Email format by e.g. creating email headers to the message, and delivers the message as an Email to the computer 829.

Figure 9:
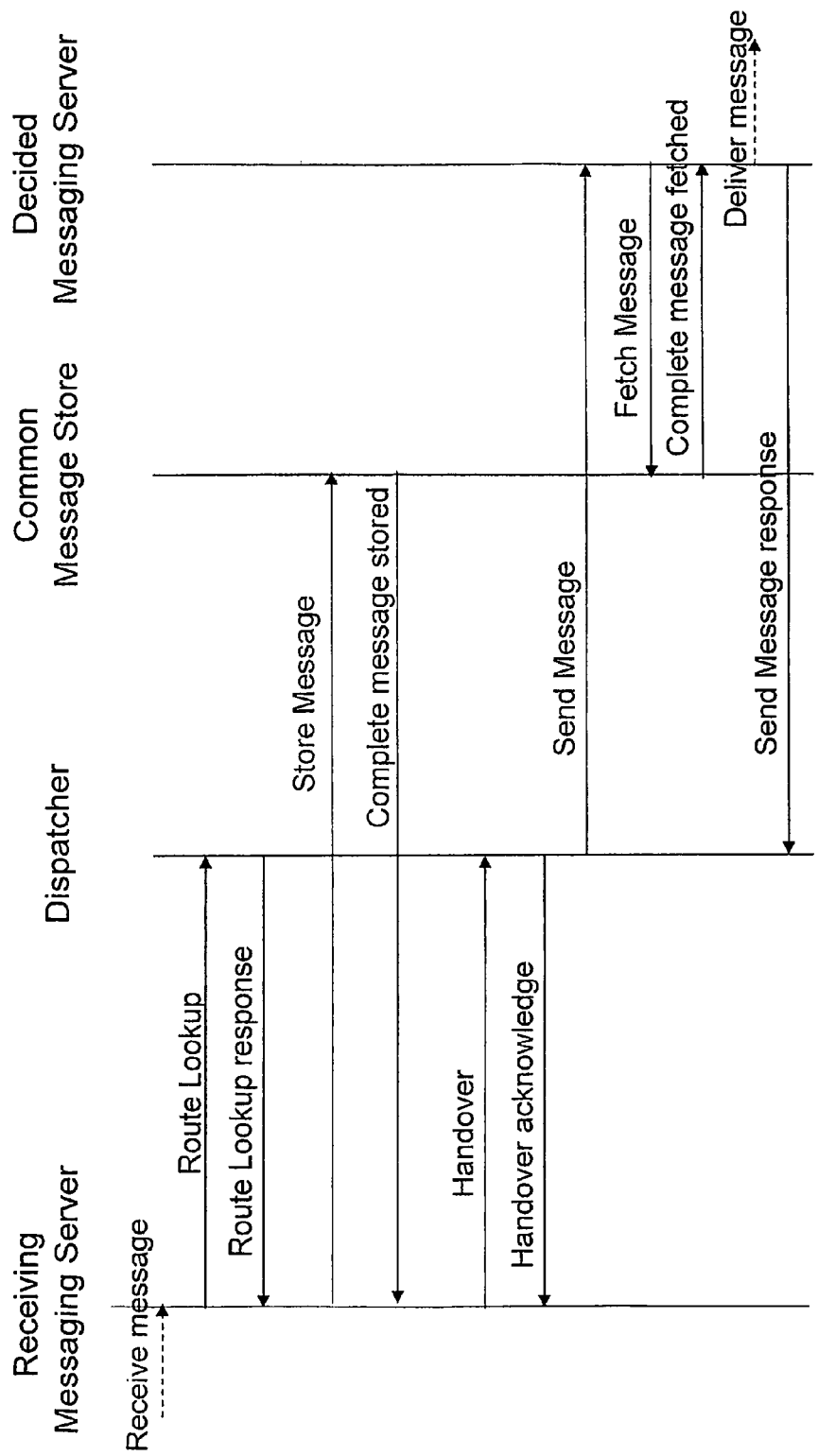
FIG. 9 shows a signalling protocol according to an embodiment of the invention.

FIG. 9 shows an example of a signalling protocol according to the invention. The signalling protocol describes signalling messages communicated between a messaging server that has received a message to be delivered to a recipient (receiving messaging server), the dispatcher, the common message store and a messaging server that will deliver the message to the recipient (decided messaging server). After the receiving messaging server has received the message (or a first part of a message), it can send a Route Lookup message to the dispatcher. The Route Lookup message asks the dispatcher whether the message may be sent directly to the receiver, using the same messaging server. The Route Lookup message is an optional message, which is only used if the receiving messaging server has the ability to use direct delivery. The dispatcher decides whether the message can be delivered directly by e.g. checking the user preferences of the recipient. Thereafter, the dispatcher sends a Route Lookup response to the receiving messaging server to inform whether the message can be delivered directly or whether it should be stored in the common message store. The Route lookup response states which messaging server type that is to deliver the message, (e.g. MMS, SMS, Voice mail etc.). The Route Lookup response could also contain "No messaging server" forcing an unconditional store of the message. If the message is to be delivered directly, i.e. the Receiving Messaging Server supports the messaging server type indicated in the Route Lookup response; the messaging server delivers the message to the recipient. If the route lookup response indicates another messaging server, later delivery or No messaging server, the receiving messaging server sends a Store Message including the message to the Common Message Store. When the message has been stored, Common Message Store responds with a Complete Message Stored. Then a Handover is sent from the receiving messaging server to the dispatcher, instructing the dispatcher to take over responsibility for the message by scheduling an "expiry event" for the message. This event is used to be able to delete an old message from the message store, and such that the message will not be stuck in the message store. The dispatcher responds with a Handover acknowledge when it has scheduled and stored the event. The dispatcher decides which messaging server to deliver the message and when to deliver the message, based e.g. on user preferences. The dispatcher will then, when the time is up for the scheduled event, in a Send Message, invoke the decided messaging server to deliver the message. As a response to the Send Message, the decided messaging server retrieves the message in a Fetch Message from the message store and delivers it to the recipient. The Common Message Store informs the Decided Messaging Server when the message has been retrieved, by sending a Complete Message Fetched. When the message has been delivered to the recipient, the decided messaging server sends a Send Message_response to the dispatcher with the context "result OK" if the message was delivered. In that case, the dispatcher deletes any additional events related to the message. If not delivered, the Send Message_response may have the context "result(permanent error)" or "result(temporary error)".

Figure 10:
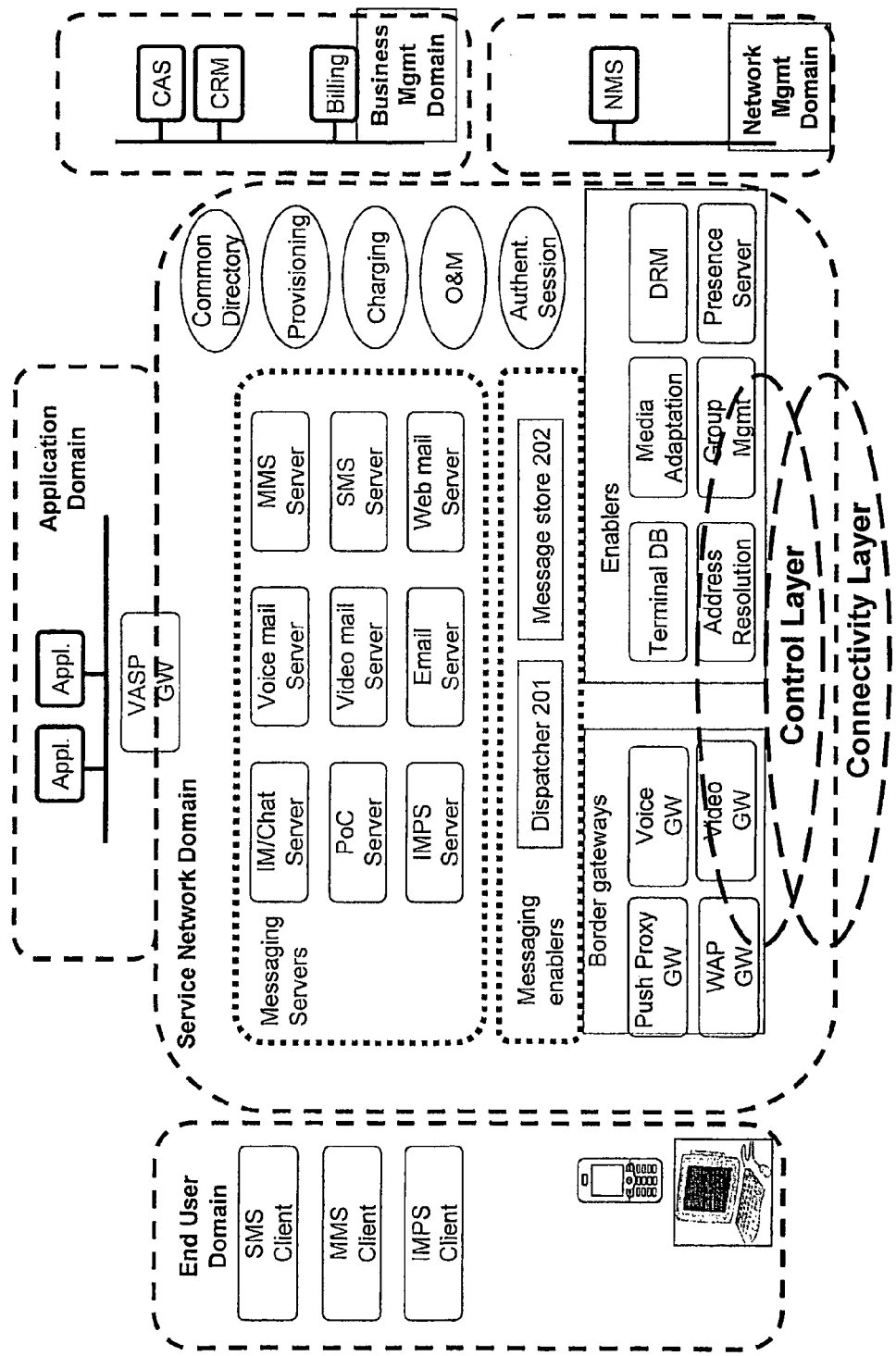
FIG. 10 is a schematic block diagram of a messaging architecture comprising a messaging arrangement according to the invention.

An example of a communication system with a horizontal messaging architecture, including the messaging arrangement of the invention, is shown in FIG. 10. This architecture would provide the end-user with a common mailbox for all his/her messages. It would also share common functions in the service layer, such as a common user profile (in the Common Directory) and common Provisioning, Charging, O&M and Authentication of sessions, which makes it possible to provide Single Sign On (SSO). The architecture would also provide the operator with a horizontal integrated messaging solution based on re-use and sharing of common components, such as enablers and border gateways, addressing the operators' operational expense and to some extent the capital expense.

The messaging architecture is based on IP protocols, which will implicitly support a heterogeneous environment with different control and connectivity layers, for example a system with support for both SIP and SS7 while running on different access technologies (GSM, WCDMA, PSTN, Broadband, ISP, etc.) Below follows a short description of the components in FIG. 10.

The Messaging servers (exemplified in FIG. 10 by an IM/chat server, a Push to talk over Cellular (PoC) server, an IMPS server, a Voice mail server etc.) contain the business logic for each messaging service handling one message type, where one important aspect is protocol handling. The Messaging servers use common functions provided by Messaging Enablers, Enablers, Border gateways and Service Network Framework (SNF) common components (i.e. Common Directory, Provisioning, Charging, O&M and Authent. Session in FIG. 10) to perform the messaging task.

As an example, when an MMS server delivers an MMS message to a recipient, the MMS Server uses the SNF Common Directory to validate that the recipient has subscribed to the service before sending out a notification via the Push Proxy Border gateway. The MMS server receives the retrieve request via the WAP Border gateway and retrieves the message from the Message Store. Before delivering the message, it checks the detailed terminal capabilities in the Terminal Database (DB) enabler and requests message transcoding from the Media Adaptation enabler if necessary.

The common messaging enablers Dispatcher and Message Store are the most important components in the new messaging architecture. They have been described in detail earlier in the application.

The Border Gateways (e.g. Push Proxy GW, Voice GW, WAP GW, Video GW) are a set of proxies that translate access dependent protocols towards the Messaging servers, e.g. Circuit Switched voice to Voice over IP in the Voice gateway.

The Enablers (e.g. Terminal DB, Media Adaptation, Digital Rights Management (DRM), etc.) are resources, which provide common functions with service-independent business logic, which can be used by other messaging components, primarily the Messaging servers to fulfil their business logic. The list of Enablers and Border Gateways in FIG. 10 is not exhaustive.

The SNF common components are a set of common functions specified by Ericsson Service Network Framework (SNF) to support a service network horizontalization of user provisioning, charging, Single Sign On (SSO) and O&M of the network nodes.

Messaging Component Description

Below follows a description of an exemplary embodiment of components in the messaging architecture of FIG. 10 involved in the solution according to the invention.

Messaging Servers

MMS Server

The MMS Server is the key component when offering multimedia-messaging services to end-users. The MMS Server receives messages from users or the Value Added Service Provider (VASP) gateway, relays the message internally or to other networks, notifies the recipients and provides status replies to the originator. This component supports the MMx interfaces specified in 3GPP TS 23.140.

Responsibilities of the MMS Server
    Store and Forward of multimedia messages
    Charging of MMS Traffic
    Policy enforcement if end-users are allowed to send/receive MMS
    Intermediate Storage of messages SMS Server The SMS server is a specialized function for delivering of SMS messages. It contains the intelligence for routing and delivery of SMS messages, which cannot be delivered immediately. This component supports SMPP and other VASP interfaces and MAP/SS7 towards the network.

Responsibilities of the SMS Server:
    SMS Message Management
    Access control for SMS Services (SMPP security, subscriber validation)
    Charging of SMS traffic
    Intermediate Storage of messages Email Server This Email Server provides access to emails from email clients (SMTP, Internet Mail Access Protocol (IMAP4) and Post Office Protocol 3 (POP3)). It also routes incoming and outgoing SMTP traffic, i.e. act as a SMTP Mail Transfer Agent (MTA).

Responsibilities:
    Access point for email clients (IMAP4, POP3)
    Routing emails to mailboxes and/or the Internet (SMTP)

Import emails from external accounts

Voice Mail Server

The Voice Mail Server component is the interface for all voice mails. It interacts with the end-user by playing/recording voice prompts and messages. Text messages can be read via Text to Speech. To navigate through the Interactive Voice Response (IVR) dialogue, navigation commands are issued by the end-user through Dual Tone Multi Frequency (DTMF), Automatic Speech Recognition (ASR), or control messages. Messages recorded are put into a VPIM/MIME envelope before being stored in the message store.

The Voice Mail Server component is connected to the border gateway via the H.323 or SIP control protocol and Real Time Protocol (RTP) media streaming.

Responsibilities:
Providing message handling via telephony (TUI) interface
Providing functionality for personal greetings and call management
Voice Mail prompt management
Playing text messages as voice
Providing IVR, DTMF and multi-modal control.
Making outbound calls for notification or delivery
Initiating notifications and other SMS services Video Mail Server The Video Mail Server component is the interface for all video mails. It interacts with the end-user by playing/recording video prompts and messages. To navigate through the dialogue, navigation commands are issued by the end-user through DTMF, ASR, or control messages. Messages recorded are put into a MIME envelope before being stored in the message store.

The Video Mail Server component is connected to the border gateway through the H.323 or SIP control protocol and RTP media streaming. Responsibilities Providing message handling via video (VUI) interface
Providing functionality for personal greetings and call management
Video Mail prompt management
Providing IVR, DTMF and multi-modal control
Making outbound calls for notification or delivery
Initiating notifications and other SMS services Web Mail Server The web/WAP based Messaging server is providing a Webmail User Interface as well as a Multimedia composer, which is the network side equivalent for the end-user composer client front end. In addition to this, it also interacts with published content enabling the composer clients to interact with operator-approved content.

Responsibilities:
Web/WAP GUI for Message creation, sending, read, delete, etc.
Interacts with handset clients and promotes content sharing.
Interfaces the Content Management System and Portal
Accommodates both public and premium content to be shared between users.
Interacts with DRM for protection of premium content.

IM/Chat Server

The IM/Chat service is the key component when offering instant messaging and chat services to end-users in the IMS environment. The IM/Chat Server receives messages from users or the VASP gateway, relays the message internally to users or their message store if not available; or to other networks. This component supports SIP/SIMPLE Immediate messaging (SIP MESSAGE); Session based messaging (SIP/MSRP) and deferred messaging according to Open Mobile Alliance (OMA) SIMPLE AD Architecture & Reference Points.

Responsibilities:
Forward IM/Chat traffic
Charging of IM/Chat traffic
Host public and private chat rooms
Policy enforcement if end-users are allowed to send/receive IM
Storage of messages when user not available PoC Server The PoC server is the key component when offering instant voice messaging to end-users in the IMS environment. The PoC Server receives messages from users or the VASP gateway, relays the messages internally to users or their message store if not available; or to other networks. This component supports (SIP/RTP, i.e. VoIP) according to OMA POC AD Architecture & Reference Points.

Responsibilities:
Charging of PoC Traffic
Group exploder for PoC
Policy enforcement if end-users are allowed to participate
Storage of messages when user not available IMPS Server The IMPS service is the key component when offering instant messaging and chat services to end-users in the IMPS (former Wireless Village) environment. The IMPS Server receives messages from users or the VASP gateway, relays the message internally to users; or to other networks: This component supports CSP and SSP according to OMA IMPS 1.2.

Responsibilities:
Forwarding IM/Chat traffic
Charging of IM/Chat Traffic
Group exploder for chat
IMPS Presence and Group management
Policy enforcement if end-users are allowed to send/receive IM Messaging Enablers Message Store The Message Store component is basically a file server NAS, which main task is to store messages via a Network File System (NFS) interface. The Message store is hosting the end-user's common mailbox, which has a set of sub-folders (Inbox, Outbox, Sent messages, Archive, etc.) to aid the end-user in administrating his/her stored messages.

Responsibilities:
Storing messages (voice, video, text, and pictures)

Dispatcher

The Dispatcher is a key component for the message delivery and is responsible for ensuring the delivery of messages stored in the message store, either by notifying the end-user via the Messaging servers to take actions or to initiate the delivery mechanisms.

The Dispatcher schedules events as a result of a message arrival indication from the Messaging servers and, when the events trigger, dispatch them back to the Messaging server specified in the event. The invoked Messaging server then notifies the end-user/terminal to retrieve the message according to its service specific rules and interfaces, e.g. SMS, WAP Push, SIP Push, email, etc.

One of the main reasons for centralizing the Dispatcher is to allow for event cancellation from any of the Messaging servers in case a message is acted upon from a secondary interface while it is still scheduled for delivery on the primary interface. E.g. voice mail retrieved via Voice service while it is scheduled for delivery as MMS. The Voice Mail server may then cancel the MMS delivery, subject to user preferences.

In case of multiple recipients, the Dispatcher has the responsibility to invoke one Messaging server instance per recipient, which subject to user preferences could e.g. result in having the message delivered as MMS to some recipients and SMS to others.

Responsibilities:
Decide which Messaging server to invoke for message delivery primary based on message type and the recipients preferences.
Time schedule events, e.g. for re-tries or deferred delivery.
Group list exploder.

Enablers
Presence Server

A Presence server aids in enriching the user's messaging experience by providing Messaging servers with the status, preferences and communication capabilities of the recipient.

In the client platform the messaging client can interact with the presence client to optimize the sending of the message based on the knowledge of the recipient's presence.

Responsibilities:
Provides presence attributes such as communication means, availability, network and user preferences.
Communicates with the Messaging servers through SIMPLE, XML Configuration Access Protocol (XCAP) and HTTP technology as specified in IETF, 3GPP and OMA.
Interacts with HSS and Parlay Gateways to pickup user presence information.
Communicates with OMA/Wireless Village, PoC, 3GPP R6 and SIP clients for presence information presentation.

SNF Common Functions

In this section only functionality and responsibilities related to messaging is described.

Common Directory

The common directory stores information about users, i.e. recipients, and services. It contains generic subscriber and service information that is shared by messaging components.

Responsibilities:
Stores generic user information;
Provides interfaces for subscriber provisioning;
Supplies user and service information to other components;
Supports Light Directory Access Protocol (LDAP) chaining to secure scalability and reliability of the directory.

The common directory is created to replace each individual directory in the prior art messaging products. The directory can, according to one embodiment of the invention, comprise two parts: a data model and a directory engine.

The data model, which also allows for future changes, could be arranged with separate branches in a directory information tree (DIT) for common attributes and for each application.

The user profile of a messaging user can be stored in an LDAP version 3 compliant common directory. The LDAP data schema hosted on the directory is proposed to have one common part for attribute sharing between the Messaging servers (and possibly other applications) and one Messaging server specific part. This gives flexibility in attribute sharing, still allowing for addition of new Messaging servers and application specifics that can be migrated to the common part over releases.

In one implementation of the invention, The Directory engine is built on a directory in MMC called External Directory (EDS), which is a high-performing LDAP directory, which scales through partitioning of the user base. EDS is enhanced with a distribution database, which then allows for high-performance searches for multiple keys.

Modification of the user profile is always handled via the Messaging servers, which has the responsibility of validating the data, e.g. value range, attribute consistency, ensure mandatory attributes are provided, etc. Common attributes are stored in the common attribute part and messaging server specific data is stored per messaging server in the messaging server specific part.

Figure 11:
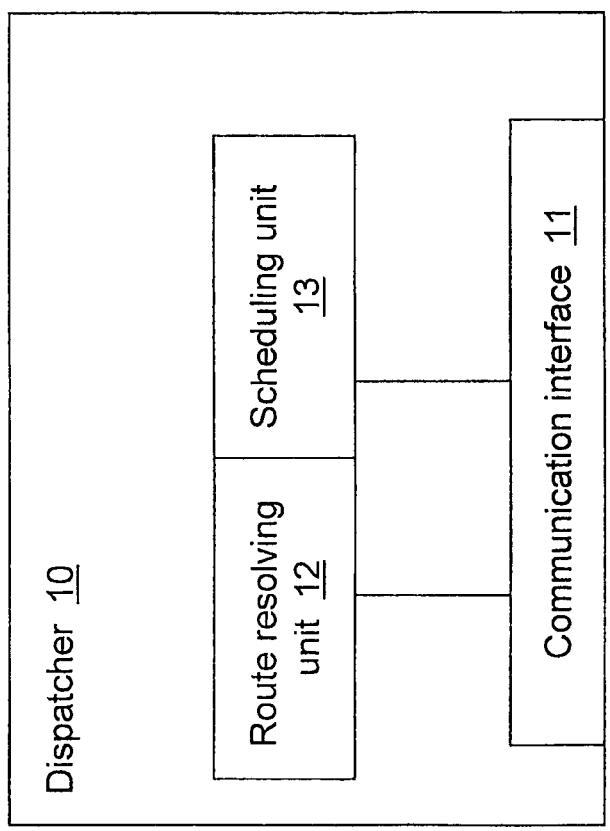
FIG. 11 illustrates a schematic block diagram of a dispatcher according to the invention.

FIG. 11 shows a schematic block diagram of an embodiment of a node in the communication arrangement of the invention for delivering messages to recipients, which node is arranged to work as a dispatcher. The node 10 comprises:

a communication interface 11 arranged for communicating with other entities in the messaging arrangement, such as the different messaging servers, a common directory and a presence server;

a route resolving unit 12 for deciding which route the message shall take through the messaging arrangement, i.e. which messaging server to use for delivering the message to a recipient; and a scheduling unit 13 for scheduling when to deliver a message to a recipient. The scheduling unit uses a timer for keeping track of the time to deliver the message.

The node is arranged for:
receiving, at the communication interface, information from a messaging server of a message received at the messaging server,
deciding a messaging server responsible for delivery of the message, based on delivery preferences of the recipient;
invoking the decided messaging server to deliver the message.

The node may also be arranged for deciding when to deliver the message based on the delivery preferences of the recipient. In another embodiment, the node is arranged for checking the delivery preferences of the recipient by communicating with a common directory storing the delivery preferences of the recipient, and, optionally, by communicating with a presence server keeping track of presence information of the recipient, i.e. where the recipient is situated and the status of the recipient.

The methods of the invention may be performed by software, which is loadable into a computer arrangement situated in a node in the communication system.

As mentioned, with the method and messaging arrangement according to the invention, it is achieved that a recipient of a message may receive a message in a type and format as requested by the recipient, regardless of message type for the message when it was sent. Also, by using the messaging arrangement and method for delivering messages according to the invention, it will be possible for an operator to easily add any new messaging technology handling a new message type to the operator's messaging solution.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method in a communication system for delivering communication messages to recipients, wherein the communication system comprises:
a number of messaging servers for handling different types of messages, each messaging server handling messages of a certain message type;

a common message store for storing messages received from any of the number of messaging servers, and a dispatcher, including a scheduling unit with a timer, for controlling the delivery of messages to the recipient, for handling the delivery of messages to the recipients, the method comprising the steps of:

receiving, in a receiving messaging server, a message destined to a recipient of the message;

sending, by the receiving messaging server, a route lookup message to the dispatcher;

deciding, by the dispatcher, whether the message received at the messaging server is to be delivered directly;

invoking, by the dispatcher, the receiving messaging server to deliver the message, if the message is to be delivered directly;

storing the message in the common message store, if the message is not to be delivered directly;

informing by the receiving messaging server, the dispatcher of the received message;

deciding, by the dispatcher, which messaging server to invoke for delivery of the message;

invoking, by the dispatcher, the decided messaging server to deliver the message;

receiving, at the decided messaging server, the message from the message store;

adapting the message to a message type handled by the decided messaging server, if the message is of a type different from the message type handled by the decided messaging server;

deciding, by the dispatcher, when to deliver the message based on the delivery preferences of the recipient; and delivering the message to the recipient.

2. The method according to claim 1, wherein the message is stored in the common message store in a mailbox associated with the recipient, and wherein the recipient has one mailbox for all messages destined to the recipient, irrespective of the message type.

3. The method according to claim 1 further comprising the steps of, after the step of invoking: notifying the recipient of the message; receiving a request for retrieval of the message from the recipient; and retrieving the message from the message store after receiving such a request.

4. The method according to claim 1, further comprising the steps of: informing the dispatcher that the message was delivered, and deleting, in the dispatcher, any outstanding events related to the delivered message, such as any scheduled retry events.

5. The method according to claim 1, further comprising the steps of, by the dispatcher: scheduling a retry event, for at a later instance invoking the decided messaging server a second time, invoking the decided messaging server a second time, when the retry event is scheduled, if the message was not delivered at the step of delivering the message.

6. The method according to claim 1, wherein the decision which messaging server to invoke for delivery of the message is based on message delivery preferences of the recipient.

7. The method according to claim 6, wherein the communication system also comprises a common directory, in which message delivery preferences of recipients in the communication system are stored, the method comprising the step of: checking, by the dispatcher, in the common directory, the delivery preferences of the recipient before deciding which messaging server to invoke for delivery of the message.

8. The method according to claim 6, wherein the decision which messaging server to invoke for delivery of the message is also based on presence information of the recipient.

9. The method according to claim 1 wherein the dispatcher decides, apart from which messaging server to invoke for delivery of the message, when the decided messaging server shall be invoked.

10. The method according to claim 1, wherein the message is adapted to the message type of the decided messaging server by mapping or creating message header attributes related to the message type of the decided messaging server.

11. An arrangement for delivering communication messages to recipients in a communication system the arrangement comprising:

a number of messaging servers adapted for handling different types of messages, each messaging server being adapted for handling messages of a certain message type;

a common message store adapted for storing messages received from any of the messaging servers;

a dispatcher adapted for handling the delivery of messages to the recipients, comprising a scheduling unit with a timer for controlling the delivery of messages to the recipient, wherein each of the number of messaging servers is further adapted for:

receiving a message destined to a recipient of the message;

sending, by the receiving messaging server, a route lookup message to the dispatcher;

informing the dispatcher of the received message;

deciding, by the dispatcher, whether the message received at the messaging server is to be delivered directly;

invoking, by the dispatcher, the receiving messaging server to deliver the message, if the message is to be delivered directly;

storing the message in the common message store, if the message is not to be delivered directly;

adapting the message to a message type handled by the messaging server, if the message is of a type different from the message type handled by the messaging server;

delivering the message to the recipient, and wherein the dispatcher is further arranged for:

deciding which messaging server to invoke for delivery of the message;

deciding when to deliver the message based on the delivery preferences of the recipient; and invoking the decided messaging server to deliver the message.

12. The arrangement according to claim 11, wherein the common message store is arranged to store the message in a mailbox associated with the recipient, and wherein the recipient has one mailbox for all messages destined to the recipient, irrespective of the message type.

13. The arrangement according to claim 11, wherein at least one of the number of messaging servers is arranged for: notifying the recipient of the message; receiving a request for retrieval of the message from the recipient; and retrieving the message from the message store after receiving such a request.

14. The arrangement according to claim 11, wherein each messaging server is further arranged for informing the dispatcher that the message was delivered, and the dispatcher is further arranged for deleting any outstanding events related to the delivered message, such as any scheduled retry events.

15. The arrangement according to claim 11, wherein the dispatcher is further arranged for: scheduling a retry event, for at a later instance invoking the decided messaging server a second time, and invoking the decided messaging server a second time, when the retry event is scheduled, if the message has not been delivered to the recipient.

16. The arrangement according to claim 11, wherein the dispatcher is arranged for deciding which messaging server to invoke for delivery of the message based on delivery preferences of the recipient.

17. The arrangement according to claim 11, which is associated with a common directory arranged for storing delivery preferences of recipients in the communication system, and wherein the dispatcher is further arranged for checking, in the common directory, the delivery preferences of the recipient before deciding which messaging server to invoke for delivery of the message.

18. The arrangement according to claim 16, which is further associated with a presence server arranged for storing presence information of recipients in the communication system, and wherein the dispatcher is further arranged for checking, in the presence server, presence information of the recipient, and for deciding which messaging server to invoke for delivery of the message based on the presence information of the recipient.

19. The arrangement according to claim 11, wherein the dispatcher is further arranged for deciding when the decided messaging server shall be invoked.

20. The arrangement according to claim 11, wherein the number of messaging servers is arranged for adapting the message to the message type of the decided messaging server by mapping or creating message header attributes related to the message type of the decided messaging server.

21. A node in a communication system arranged for handling delivery of communication messages to recipients, the communication system having a number of messaging servers for handling different types of communication messages, each messaging server being arranged to handle messages of a certain message type, the node comprising:
- a communication interface arranged for communication with other entities in the communication systems, and a dispatcher comprising a route resolving unit and a scheduling unit, the scheduling unit including a timer, for controlling the delivery of messages to the recipient, wherein the node is arranged for
- sending, by the receiving messaging server, a route lookup message to the dispatcher;
- receiving, at the communication interface, information from the messaging server of the route lookup message;
- deciding, by the dispatcher, whether the message is to be delivered directly;
- deciding a messaging server responsible for delivery of the message, based on delivery preferences of the recipient;
- the dispatcher deciding when to deliver the message based on the delivery preferences of the recipient;
- invoking, by the dispatcher, the receiving messaging server to deliver the message, if the message is to be delivered directly; and
- storing the message in the common message store, if the message is not to be delivered directly.

22. The node according to claim 21, further being arranged for checking the delivery preferences of the recipient by communicating with a common directory storing the delivery preferences of the recipient, and, optionally, by communicating with a presence server storing presence information of the recipient.

23. The node according to claim 21, further being arranged for: receiving information from the decided messaging server that the message was delivered to the recipient, deleting any outstanding events related to the delivered message.

24. The node according to claim 21, further being arranged for: scheduling a retry event, for at a later instance invoking the decided messaging server a second time, invoking the decided messaging server a second time, when the retry event is scheduled, if the message was not delivered at the step of delivering the message.

* * * * *

UNITED STATES PATENT AND TRADEMARK OFFICE
CERTIFICATE OF CORRECTION

PATENT NO. : 8,478,825 B2  
APPLICATION NO. : 11/909518  
DATED : July 2, 2013  
INVENTOR(S) : Gustafsson et al.

Page 1 of 1

It is certified that error appears in the above-identified patent and that said Letters Patent is hereby corrected as shown below:

On the Title Page, Item (54), and in the Specification, Column 1, Line 1, under "Title", delete "ARRANGMENT" and insert -- ARRANGEMENT --, therefor.

In the Specification

In Column 5, Line 14, delete "invention." and insert -- invention; and --, therefor.

In Column 9, Line 34, delete "an Network" and insert -- a Network --, therefor.

In Column 12, Line 16, delete "muted" and insert -- routed --, therefor.

In Column 14, Line 41, delete "Server" and insert -- Server: --, therefor.

In the Claims

In Column 22, Line 3, in Claim 21, delete "arranged for" and insert -- arranged for: --, therefor.

Signed and Sealed this  
Twenty-ninth Day of July, 2014

Michelle K. Lee  
*Deputy Director of the United States Patent and Trademark Office*